(12) United States Patent
Lecomte

(10) Patent No.: US 10,358,026 B2
(45) Date of Patent: Jul. 23, 2019

(54) AUTOMATIC TRANSMISSION FOR HYBRID VEHICLE AND METHOD FOR CONTROLLING A HYBRID VEHICLE

(71) Applicant: PUNCH POWERGLIDE STRASBOURG (SOCIETE PAR ACTIONS SIMPLIFIEE), Strasbourg (FR)

(72) Inventor: Olivier Lecomte, Lipsheim (FR)

(73) Assignee: PUNCH POWERGLIDE STRASBOURG (SOCIETE PAR ACTIONS SIMPLIFIEE), Strasbourg (FR)

( * ) Notice: Subject to any disclaimer, the term of this patent is extended or adjusted under 35 U.S.C. 154(b) by 93 days.

(21) Appl. No.: 15/533,930

(22) PCT Filed: Dec. 4, 2015

(86) PCT No.: PCT/FR2015/053328
§ 371 (c)(1),
(2) Date: Jun. 7, 2017

(87) PCT Pub. No.: WO2016/092184
PCT Pub. Date: Jun. 16, 2016

(65) Prior Publication Data
US 2017/0334280 A1 Nov. 23, 2017

(30) Foreign Application Priority Data
Dec. 8, 2014 (FR) ...................................... 14 62055

(51) Int. Cl.
*B60K 6/48* (2007.10)
*B60K 6/365* (2007.10)
(Continued)

(52) U.S. Cl.
CPC ................ *B60K 6/365* (2013.01); *B60K 6/48* (2013.01); *B60K 6/547* (2013.01); *F16H 3/663* (2013.01);
(Continued)

(58) Field of Classification Search
CPC ......... B60K 6/365; B60K 6/547; F16H 3/663; F16H 2200/0047; F16H 2200/2025;
(Continued)

(56) References Cited

U.S. PATENT DOCUMENTS

| 3,380,448 A | 4/1968 | Sadove et al. |
| 2007/0099738 A1 | 5/2007 | Holmes |

(Continued)

FOREIGN PATENT DOCUMENTS

| DE | 10 2005 039 592 A1 | 2/2007 |
| EP | 1 386 771 A2 | 2/2004 |

(Continued)

OTHER PUBLICATIONS

International Search Report, dated Feb. 16, 2016, from corresponding PCT application, PCT/FR2015/053328 (2 pages).

*Primary Examiner* — Mark J Beauchaine
(74) *Attorney, Agent, or Firm* — Young & Thompson

(57) ABSTRACT

Disclosed is an automatic transmission for a hybrid vehicle, the automatic transmission including an input shaft driven by the combustion engine, an output gearwheel, ring gear or pinion, a stationary element such as a casing for example, an electric machine of which the stator is secured to the stationary element, first, second, third, fourth and fifth selective torque transmitting members that can be selectively engaged or activated in order to establish different transmission ratios, a single double planetary gearset of the Ravigneaux type (TPR) the constituent functional elements of which are arranged as two sets of planetary gears con- (Continued)

nected by the aforementioned members to the input shaft and to the stationary element, the rotor of the electric machine being mounted on a functional element that injects the movement of the gearset.

20 Claims, 5 Drawing Sheets

(51) Int. Cl.
  *B60K 6/547* (2007.10)
  *F16H 3/66* (2006.01)
(52) U.S. Cl.
  CPC ... *B60K 2006/4816* (2013.01); *B60Y 2300/70* (2013.01); *B60Y 2400/732* (2013.01); *F16H 2200/0047* (2013.01); *F16H 2200/2005* (2013.01); *F16H 2200/2007* (2013.01); *F16H 2200/2025* (2013.01); *F16H 2200/2043* (2013.01); *Y02T 10/6221* (2013.01); *Y02T 10/6256* (2013.01); *Y10S 903/945* (2013.01)

(58) Field of Classification Search
  CPC ..... F16H 2200/2007; F16H 2200/2043; B60Y 2400/732; B60Y 2300/70; Y10S 903/945
  See application file for complete search history.

(56) References Cited

U.S. PATENT DOCUMENTS

| 2008/0011529 | A1  | 1/2008 | Honer et al. |
| 2008/0176704 | A1* | 7/2008 | Raghavan ............... F16H 3/728 |
| | | | 475/275 |
| 2012/0174708 | A1  | 7/2012 | Nagamori et al. |

FOREIGN PATENT DOCUMENTS

| FR | 1 454 773 A     | 10/1966 |
| WO | 2008/141876 A1  | 11/2008 |
| WO | 10 2010 031 026 A1 | 1/2012 |
| WO | 2014/020992 A1  | 2/2014  |

* cited by examiner

| Mode | Torque ratio | C124 | C345 | C23 | C5 | C1 |
|---|---|---|---|---|---|---|
| E1 | 1.907 | | | | | X |
| E2 | 1.290 | | | X | | |
| E3 | 0.701 | | | | X | |
| 1 | 4.031 | X | | | | X |
| 2 | 1.969 | X | | X | | |
| 3 | 1.290 | | X | X | | |
| 4 | 1.000 | X | X | | | |
| 5 | 0.701 | | X | | X | |

Fig. 2

| Heat Ratio | 1 | 2 | 3 | 4 | 5 |
|---|---|---|---|---|---|
| Heat engine transmission / output | 4.031 | 1.969 | 1.290 | 1 | 0.701 |
| Electric motor transmission / output | 1.907 | 1.290 | 1.290 | 1 | 0.701 |

Fig. 4

| Mode | Torque ratio | C124 | C345 | C23 | C5 | C1 |
|---|---|---|---|---|---|---|
| E1 | 1.907 | | | | | X |
| E2 | 1.290 | | | X | | |
| E3 | 0.701 | | | | X | |
| 1 | 4.031 | X | | | | X |
| 2 | 1.969 | X | | X | | |
| 3 | 1.290 | | X | X | | |
| 4 | 1.000 | X | X | | | |
| 5 | 0.701 | | X | | X | |

Fig. 3A

| Mode | Torque ratio | C124 | C345 | C23 | C5 | C1 |
|---|---|---|---|---|---|---|
| E1 | 1.907 | | | | | X |
| E2 | 1.290 | | | X | | |
| E3 | 0.701 | | | | X | |
| 1 | 4.031 | X | | | | X |
| 2 | 1.969 | X | | X | | |
| 3 | 1.290 | | X | X | | |
| 4 | 1.000 | X | X | | | |
| 5 | 0.701 | | X | | X | |

Fig. 3B

AUTOMATIC TRANSMISSION FOR HYBRID VEHICLE AND METHOD FOR CONTROLLING A HYBRID VEHICLE

The present invention concerns automobile equipment, and especially equipment for hybrid heat/electrical vehicles (consisting of a heat motor, generally an internal combustion motor, and at least one electrical machine), the purpose of the invention being an automatic transmission or an automatic geartrain optimized for such vehicles.

More specifically, the subject of the invention is a transmission system for hybrid vehicles that can operate in "purely" electrical transmission, i.e. for vehicles that are capable of propulsion through the action of a single electric motor, and for which the drive, via a heat motor and an electric motor, transit through the same transmission before their application to the drive wheels.

Two types of architecture exist for the abovementioned type of vehicle in the current state of the art.

The first type of architecture corresponds to parallel hybrids known as the "P2" type, that function by means of an electric machine placed between the heat motor and the gearbox. A specific decoupling clutch is planned that makes it possible to disconnect the heat motor from the drivetrain.

When this decoupling takes place, the vehicle operates as a purely electric type, the electric machine, instead of the combustion motor, providing torque to the gearbox. The electric machine can also serve as a transmission brake in a normal braking situation. It is then in generation mode, producing electricity so as to recharge the battery. The gearbox then operates in the traditional manner, adapting the speed ratios to the optimal operating mode of the electric motor. In the absence of decoupling, when the heat motor is connected, the electric machine can be solicited as an motor or as a generator, either to provide additional power during acceleration or to recharge the battery.

This initial architecture is the solution that is most regularly used currently, at least in the European market.

It has the advantage of making it possible to use an existing gearbox to which an electric motor and a decoupling clutch are attached upon entry, making it possible to detach the combustion motor from the drivetrain. This means that there is no need to develop a specific hybrid transmission system. Furthermore, when the battery is flat and the vehicle can only be operated by means of the heat motor, a high number of gear ratios continues to be available, making it possible to run the heat motor at its optimum performance level.

This first known solution also has some disadvantages, however. It becomes difficult, especially for high-powered electrical, rechargeable machines (of more than 40 kW, especially on vehicles of the "plug-in" type, i.e. rechargeable from an external source) to incorporate the machine into the gearbox, and the result is an increase in the overall footprint of the powertrain. The size constraints imposed if the machine is located between the motor and the transmission means that these automobiles need to be fitted with permanent magnets, making them expensive to manufacture.

On the other hand, it has been determined that the greater the power in the electrical system in comparison with that of the heat motor, the less need there is for speed ratios to achieve the same vehicle performance.

Finally, when the battery is flat, and no more energy is available for starting the electric motor, a specific ignition system is required for the heat motor (such as, for example, a hydraulic torque converter or friction clutch). In other words, the resulting system will be too cumbersome, too expensive, and too complex in comparison with the performances achieved.

Examples of transmission construction that are suited to this initial type of architecture are disclosed in documents US 2008/011529 and WO 2008/141876.

A second type of architecture is known under the name of serial hybrids or serial-parallel hybrids.

In the case of this second solution, a generator powered by a heat motor produces electricity that is used to operate an electric motor that drives the vehicle (in serial operation). In most of the present arrangements, part of the heat motor power is still transmitted mechanically to the wheels (serial-parallel operation).

A system of this kind is perfectly optimized for hybrid operation, with an infinity of ratios enabling the electrical motors to operate and be perfectly optimized for hybrid operation, with an infinity of ratios enabling the operation of electric machines and the motor with optimized operation, requiring a minimum of gearsets and clutch movements (because there is no need for multiple mechanical speed ratios). Furthermore, there is no need for a specific ignition system on the combustion motor because ignition can always be performed in serial mode.

On the other hand, there is a major disadvantage in the additional weight and cost resulting from the use of two electric machines, while only one is actually used to propel the vehicle. Thus, in the case of serial operation, a 60 kW electric motor is required for vehicle propulsion so that a 60 kW generator also needs to be included. In conclusion, twice the desired propulsion power needs to be on board (see, for example, EP 1 386 771 and US 2012/174708).

In an attempt to remove the disadvantages and overcome the limitations of the existing solutions, transmissions and gearsets specially adapted for hybrid vehicles, incorporating an electric motor, have been developed in the meantime and are on sale in the market.

This new generation of transmissions generally presents with the following characteristics:
  Between two and five gearsets that can be used to propel the vehicle via the combustion motor,
  One or two gearset(s) for propelling the vehicle using the electric motor,
  A method of startup or ignition via the combustion motor, using the electric machine in generator mode as a speed regulator (operating method in variable ratio, see, for example, DE 102010031026A1).

The number of ratios associated with an electric motor in these new types of transmission is adjusted to the needs of a hybrid vehicle (no superfluous equipment is required for six or eight geartrains). The possible use of two electrical geartrains make it possible to adjust the operation of the electric machine in the ranges of operation and torque in which is most efficacious, thus enabling the use of asynchronous motors that are less expensive than motors containing permanent magnets, but with a reduced area of optimal efficacy. The startup mode in a variable ratio makes it possible to economize on a starter device on the vehicle's motor (of the converter type or high-capacity energy dissipation capacity), while always having the option of startup other than electrically, especially when the batteries have reached their minimum charging threshold (for example, as the result of repeated startups in congested traffic).

These new transmission developments, specifically designed for hybrid vehicles, nevertheless still require complex construction, for instance, with a requirement for at least three planetary gearsets and generally a relatively small number of ratios.

Finally, through French patent application #14 54773 in the applicant's name, improved automatic transmission for a hybrid vehicle makes it possible to obtain two gearsets with purely electrical drive, while using the combustion motor (four fixed gearsets and two continuous variation gearsets).

This implementation makes it possible to overcome at least some of the abovementioned disadvantages and limitations, and especially avoiding the requirement for a specific ignition device when using the combustion motor (startup being performed with the first ratio in continuous variation).

This improved automatic transmission that is designed to meet specific priority requirements itself presents with a certain number of limitations, however.

Thus, and firstly, electric motor drive to support combustion motor drive at least for several of the gear ratios in combustion motor drive, and especially at startup, is not possible (with the electric machine operating as a power generator).

Furthermore, where a gearset ratio for the combustion motor drive is engaged, the combustion motor and electric machine operation are relatively different for most of the ratios.

In other words, in such cases, if energy recovery or drive support using the combustion motor (in hybrid drive mode) is envisaged, the relative gearsets of the combustion motor and the electric machine, in relation to the transmission output, would present with significant differences. As a result, for a given ratio, one would rarely find oneself in the optimal yield situation for the electric machine, resulting in a reduced overall energy performance for the vehicle.

The purpose of the present invention is to overcome at least the main limitation stated previously, and preferably both of them, while retaining all other advantages of improved automatic transmission as stated above.

Another purpose of the invention is to reduce the amount of equipment regularly present in the powertrain, and thus the weight and cost of the vehicle, by using at least part of the transmission to perform additional functions.

For this purpose, it possesses automatic transmission for a hybrid heat/electric vehicle consisting of:
  An input shaft driven by the heat motor
  A gearwheel, ring gear or output pinion,
  A stationary element, such as an motor housing for example,
  An electric machine for which the stator is secured to the stationary element,
  The first, second, third, fourth, and fifth selective torque transmission parts that can be engaged or activated selectively in order to establish, on the one hand, at least three gear ratios for vehicle drive via the electric machine functioning as an motor, and on the other hand, at least five gear ratios for vehicle drive via the action of the heat motor,
automatic transmission being characterized by the fact that it also involves a single double planetary gearset of the Ravigneaux type, the constituent functional elements being arranged as first and second solar wheels, first and second gearwheels, and first and second set of satellite pinions mounted on a shared satellite bracket. These elements are arranged in two sets of planetary gears linked together by one or more long pinion(s) meshing with each of the said sets, in that the first and second selective torque transmission parts are adapted and destined to be linked selectively to the input shaft via one of the functional elements of the first set.

In that the third and fourth selective torque transmission parts are designed and destined to link selectively to one of the functional elements of the second stage with the stationary element.

In that the fifth selective torque transmission part is designed and destined to link to the functional elements of the first stage to the stationary element, and, That the electric machine's rotor is mounted directly on a functional injection element of the Ravigneaux planetary gearset, or is linked kinematically to this element by means of a multiplier or demultiplier geartrain system of the planetary or parallel type.

The invention will be better understood, thanks to the following description that refers to a preferred method of creation, provided as a non-restrictive example, and explained with reference to the enclosed diagrams, in which:

FIG. 2 represents, in relation to the transmission represented in FIG. 1, a passing matrix or table of the interlinkage of the various selective torque transmission parts, with an indication of the numbers of the gearsets and drive mode, as well as the gear range (gear ratios);

FIGS. 3A and 3B represent, on the basis of the transition matrix shown in FIG. 2, two examples of strategies for moving through the geartrain from startup through maximum speed;

FIG. 4 is a table showing, as examples, the ratios in relation to the output speed of the respective gears of the heat motor and the electric motor for the various speed ratios when in heat motor drive mode;

Figure 1:
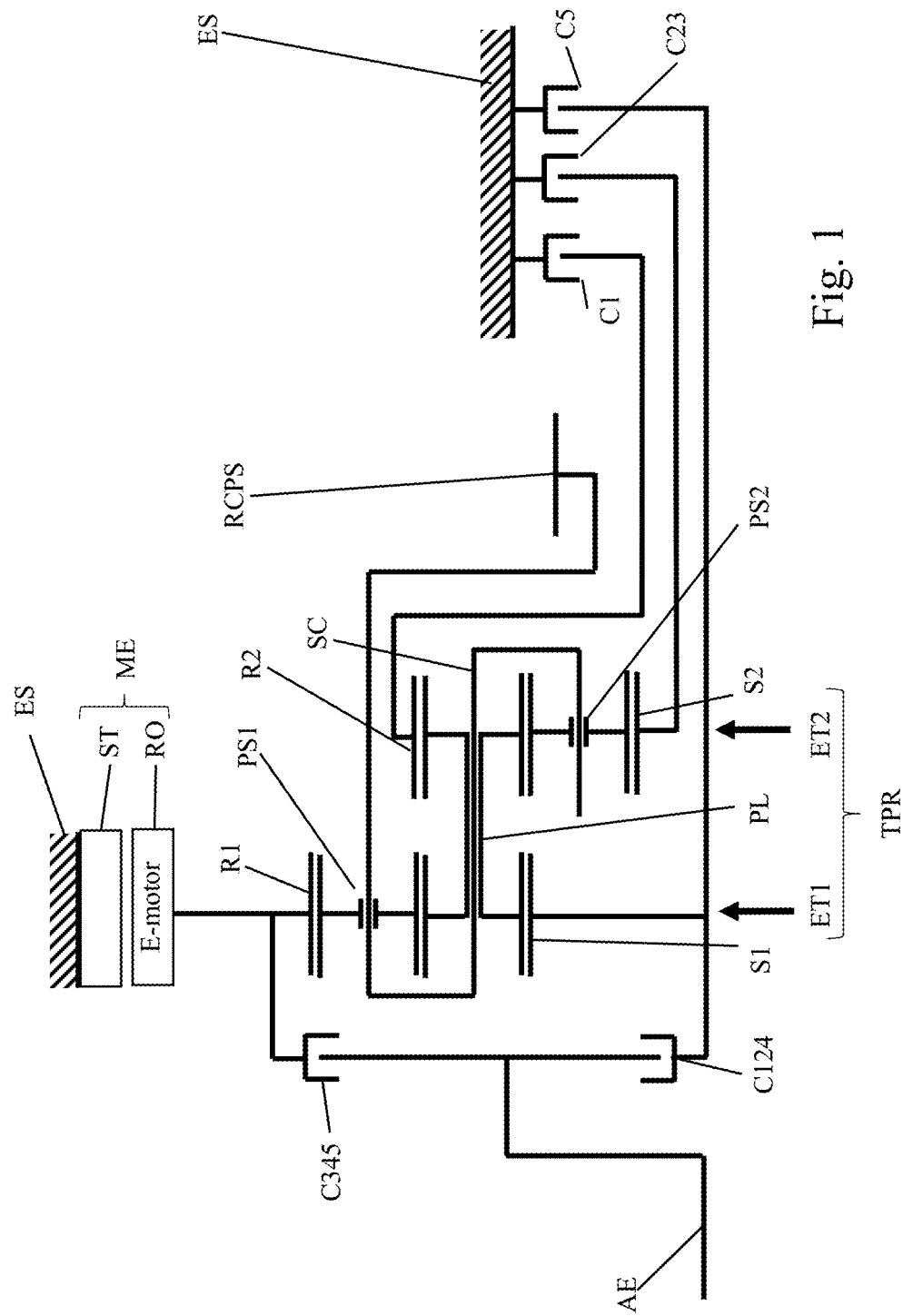
FIG. 1 is a symbolic wired representation of an automatic transmission according to the invention.
Figure 5:
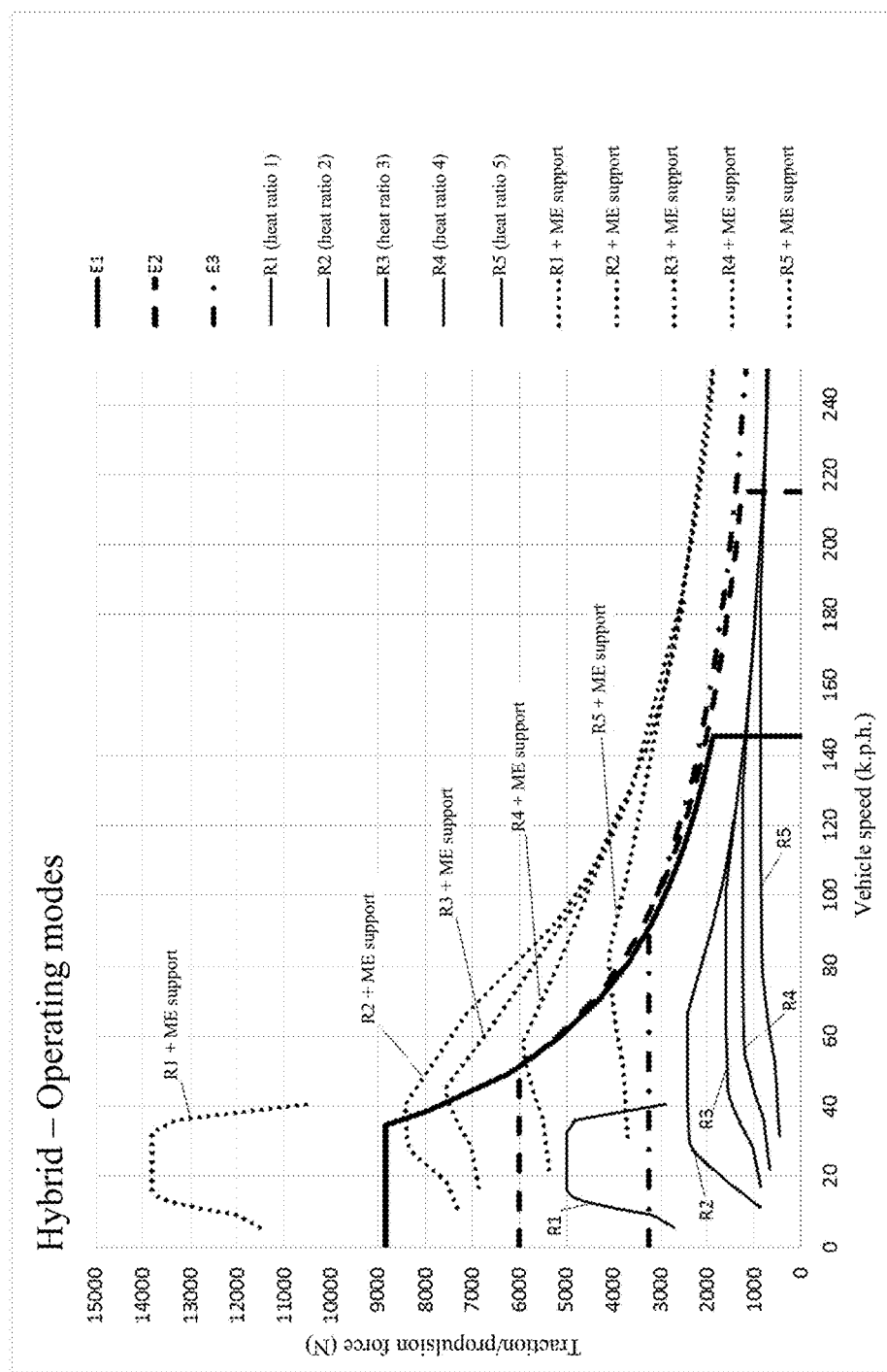
Figure 6:
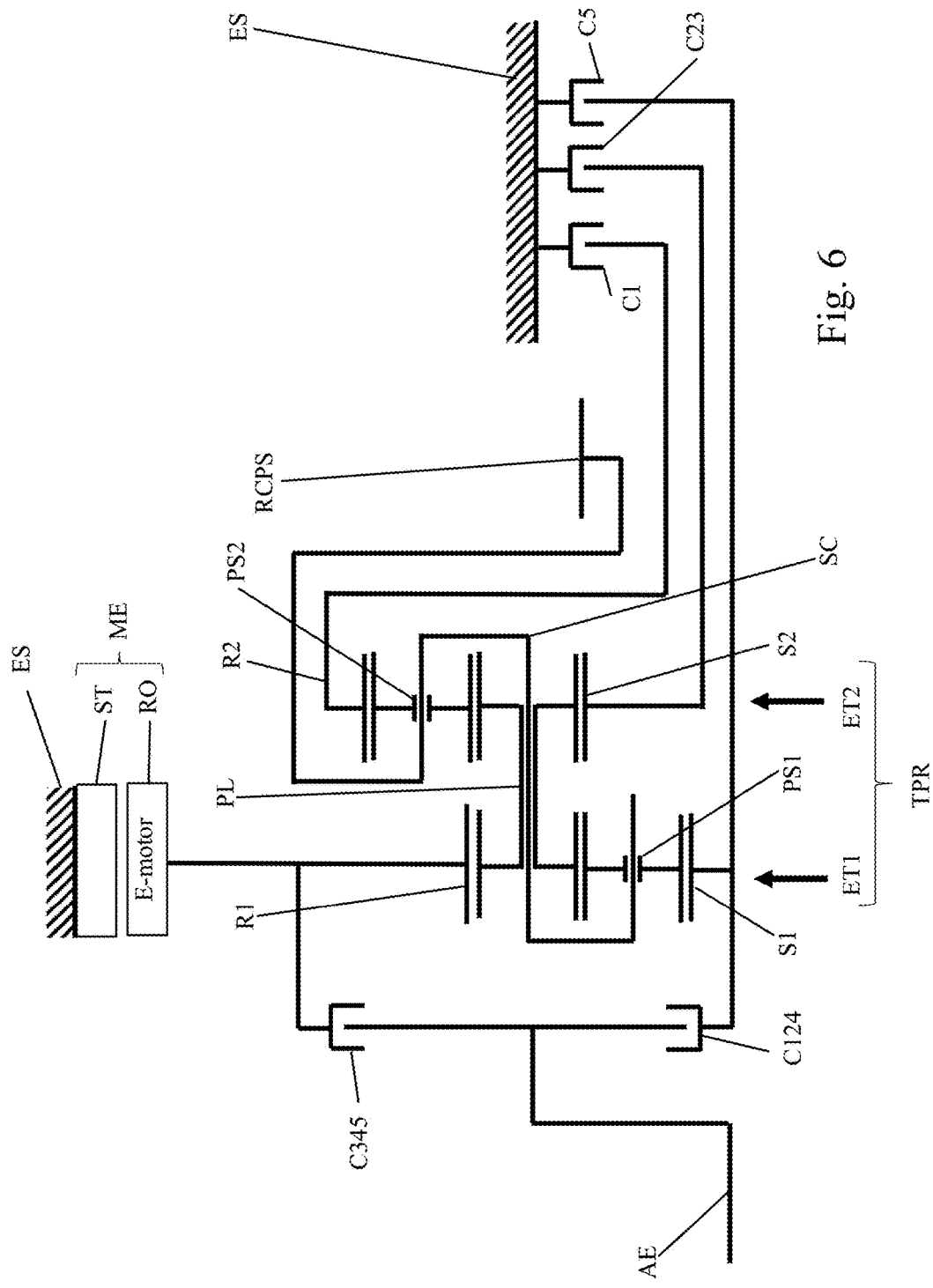

FIG. 5 shows, for the various possible modes of transmission according to the invention, the curves [traction/propulsion (N) force/speed of the vehicle (in km/h)] for a practical creation of the invention, and, FIG. 6 is a symbolic wired representation, similar to that in FIG. 1, of a variation of the creation of an automatic transmission according to the invention, the Ravigneaux gearset being mounted upside down (the transition matrix of FIG. 2 also applies to this variation).

FIGS. 1 and 6 illustrate schematically an automatic transmission for a hybrid heat/electric vehicle consisting of:
  An input shaft AE driven by the heat motor,
  An output gearwheel, ring gear or pinion RCPS,
  A stationary element ES, such as a casing, for example,
  An electric machine ME of which the stator ST is secured to the stationary element ES,
  the first, second, third, fourth and fifth selective torque transmitting members C124; C345; C1; C23; C5 that can be selectively engaged or activated to establish, on the one hand, at least three gear ratios for driving the vehicle when powered by the electric machine ME functioning as a motor, and on the other hand, at least five gear ratios to drive a vehicle powered by a heat motor.

In accordance with the invention, this transmission also consists of a single double planetary gearset of the Ravigneaux type TPR, the constituent functional elements of which consist of first and second solar wheels S1 and S2, of the first and second toothed ring gears R1 and R2 and the first and second set of satellite pinions PS1 and PS2 mounted on a shared satellite support SC, these elements being arranged in two sets of planetary gears ET1 and ET2 linked by means of one or more long pinion(s) PL engaging with each of the sets ET1 and ET2.

The first and second torque selective transmitting members C124; C345 are designed and destined to selective link the input shaft AE to one of the function elements of the first set ET1.

Furthermore, the third and fourth selective transmission members of the C1; C23 torque are designed and destined to link selectively to one of the functional elements of the second set ET2 to the stationary element ES.

Furthermore, the fifth transmission selective transmission members of the C5 torque is designed and destined to link one of the functional elements of the first set ET1 to the stationary element ES.

Finally, the rotor RO of the electric machine ME is mounted directly on a functional injection element of the movement of Ravigneaux TPR planetary gear, or is linked kinematically to this element through a system of multiplier or demultiplier gears of the planetary or parallel type.

Preferentially, the rotor RO of the electric machine ME is secured or attached kinematically to a functional element in the Ravigneaux TPR gear train that can be linked kinematically, directly to the input shaft AE by means of one of the first and secondary torque selective transmission members C124; C345. The said rotor RO is preferentially secured or attached to the toothed ring-gear R1 of the first tier ET1, that forms, along with the solar gearwheel S1, one of the functional elements for injection of movement in the Ravigneaux gearset TPR.

Note that each of the FIGS. 1 and 6 represents half of the sectional view of the transmission along a plane containing the longitudinal transmission axis (a virtual axis on which the input shaft AE and the exit route RCPS are aligned).

Thus, with a relatively simple structure (five members), that takes up little room (two sets, incorporation of the electric motor without increased longitudinal footprint) and is quite inexpensive, it is possible to supply, thanks to the invention a proposal of transmission ratios suited for optimized implementation using hybrid propulsion.

When the movement is injected into the Ravigneaux double gearset TPR by means of the ring-gear R1, this results automatically in driving the rotor RO of the electric machine ME, at the same speed (direct mounting) or at a proportional speed (mounting with intermediate gearing). According to the operational mode controlled by the said electric machine ME, this latter can operate as an motor (hybrid drive) or as a generator (for recharging the battery), within its optimal yield range.

Furthermore, thanks to the way in which the electric machine ME is installed, i.e. with the possibility of a direct link to the drive shaft AE and before the Ravigneaux gearset TPR, it can be used to start the heat motor thanks to the electric machine ME.

In examples of the production described and represented, in order to do so it is enough to close (by engaging or activating) the second clutch or a selective torque transmitting member C345.

In such a case, by using the electric machine ME as a motor, the heat motor can be driven in return and thus start it up.

All the other clutches or C124, C1, C23 and C5 members being disconnected (disengaged or deactivated), no torque is transmitted through the Ravigneaux gearset and thus none is applied to the wheels of the vehicle (no incidence in terms of vehicle movement).

This means that the heat motor's ignition can be eliminated. This makes it possible to reduce the cost and weight of the powertrain. Note that the alternator can also be eliminated since the machine ME can provide electric power when used as a generator.

By using the member C345 in a similar way (the other members being disconnected) one can do the opposite and recharge the battery while the vehicle is stationary, by operating the electric machine by means of the heat motor.

As is also shown in FIGS. 1 and 6, each long pinion PC is advantageously combined, on the one hand, with a satellite pinion PS1 on the first set ET1, which will engage with the said long pinion PL and the ring-gear R1 or the solar gearwheel S1 on the said set ET1 as well as with a satellite pinion PS2 on the second set ET2, which meshes with the said long pinion PL and with the solar gearwheel S2 or the ring-gear R2 of the said set ET2, the satellite bracket SC having the long pinion PL attached to it and with the two satellite pinions PS1 and PS2 also attached to it with the option of free rotation.

Although a single long pinion PL is shown on FIG. 1, for preference several (for example, two or three distributed around the longitudinal axis) are planned with their two satellite pinions PS1 and associated members.

In terms of entry and exit of movement of the Ravigneaux gearset, the first and second torque transmitting members C124 and C345 could be used to each be linked selectively to the input shaft AE either to the solar gearwheel S1, or to the ring-gear R1 that is part of the first set ET1 of double planetary gearset of the Ravigneaux type TPR, the gearwheel, ring-gear or output pinion RCPS being directly connected (kinematically in one piece) with the satellite-carrier SC.

The two sets ET1 and ET2 of the double planetary gearset TPR contain the various modes of meshing (ring-gears, wheels, pinions) distributed along two parallel planes at right angles to the longitudinal axis and spaced along it.

In order to be able to make optimal adjustment to the running of the thermal and electric motors under the most favorable circumstances, namely gear ratios for which engagement extends over time and which could correspond with the long-term high running of a heat motor, it could be advantageously planned for the selective torque transmitting member C345 designed and destined to selectively link the input shaft AE to the input ring-gear R1 on the first set ET1 be activated or engaged in order to establish high gear ratios when the vehicle is driven by the heat motor, preferably in third, fourth and fifth gear ratios (see FIGS. 1, 2 and 4).

Advantageously, and as also shown in FIG. 1, the fifth selective torque transmitting member C5 is suited for and designed to link the solar gearwheel S1 of the first set ET1 to the stationary element ES.

Furthermore, according to another characteristic of the invention, the third torque transmission member C1 is suited for and destined to link selectively the ring-gear R2 of the second set ET2 to the stationary element ES and the fourth transmission member C23 is suited to and destined to link selectively the solar gearwheel S2 on the second set ET2 to the stationary element ES.

Preferentially, and as illustrated in FIGS. 2, 3A and 3B, for establishing each of the speed ratios for driving the electric motor ME, only one of the third, fourth and fifth selective torque transmitting members C1; C23; C5 is activated or engaged in order to establish each of the speed ratios for driving using the heat motor, two of the five torque transmitting members C124; C345; C1; C23; C5 being activated or engaged.

As also shown in FIG. 2, it could advantageously be planned for the gear ratios for driving a vehicle by means of the heat motor consisting exclusively of gear ratios when moving forward, moving from a given gear to an immediately higher gear or an immediately lower gear being advantageously performed, on the one hand, by the disengagement or deactivation of a single member of the pair of members performing the current speed and, on the other hand, by engagement or activation of a single member that is one of a pair of members destined to produce the new speed.

The electric ratio(s) E1, E2 is/are used to start the vehicle from a stationary position when sufficient power remains in the battery. Furthermore, E1, and possibly E2, can be used for reversing the vehicle.

In accordance with an advantageous characteristic of the clutch represented in FIG. 1, illustrated by FIG. 3A, the third selective torque transmitting member C23 is activated or engaged, both upon establishing the second gear through driving the electric motor and during the establishment of the third gear through driving using the heat motor, moving from the second gear through electric drive to the third gear in heat drive being performed solely through the activation or engagement of the second selective torque transmitting member C345, the electric machine ME being capable of continuing to function in motor mode or switching into generating mode.

In accordance with another advantageous characteristic of the clutch represented in FIG. 1, illustrated by FIG. 3B and being capable of association with the abovementioned advantageous characteristic, the fourth selective torque transmitting member C5 is activated or engaged, at the same time, when the third gear is engaged by driving using the electric motor and when moving to the fifth gear in overdrive, driving via the heat motor, moving into third gear through electric drive, and to the fifth gear through the heat motor, drive being performed solely through the activation or engagement of the second selective torque transmitting member C345, the electric machine ME being able to continue to function in motor mode or by switching into generating mode.

Of course, the values of the ratios shown in the tables in FIGS. 2 and 3 are provided solely as examples and can be modified by changing the number of teeth in the gearwheels.

A practical application for the automatic transmission shown in FIG. 1, in relation to the matrix in FIG. 2, the following selective torque transmitting members or pairs of members are respectively engaged or activated to establish a gear transmission ratio:

The third member C1 for first gear driven by the electric motor ME,
The fourth member C23 for second gear driven by the electric motor ME,
The fifth member C5 for third gear driven by the heat motor ME,
The first and third members C124 and C1 for first gear driven by the heat motor,
The first and fourth members C124 and C23 for second gear driven by the heat motor,
The second and fourth members C345 and C23 for the third gear driven by the heat motor,
The first and second members C124 and C345 for fourth gear driven by the heat motor, corresponding to a transmission ratio of 1 (direct drive),
The second and fifth members C345 and C5 for fifth gear driven by the heat motor.

The performances and range of uses of the various modes of transmission operation according to the invention are illustrated, as examples, in the form of graphics representing the traction/propulsion force in newtons, based on the speed of the vehicle in kilometers per hour in FIG. 5.

Note the three available gear ratios for driving using the electric motor (curves ME1 through ME3) and the five available gear ratios for driving using the heat motor on its own (curves R1 through R5), the latter being backed up by five additional gear ratios corresponding to heat motor drive assisted by the electric machine ME functioning in motor mode (curves Ri+ME support).

Determining the optimal ranges of operation in the various drive modes is, of course, in the field of the normal practical knowledge of a person skilled in the art.

The present invention also concerns a process for controlling a hybrid vehicle fitted with automatic transmission as described above and fitted to a hybrid vehicle that has a rechargeable battery.

At startup, the process consists of checking the level of battery charge and comparing it with the lowest threshold value, either starting up the vehicle kinematically by means of the heat motor on its own if the level of charge is below the threshold value, by engaging the first gear ratio in drive mode via the heat motor, the third member C1 serving as the starting clutch, or starting the vehicle kinematically by using the electric motor ME if the level of charge is greater than or equal to the threshold value by engaging the first gear ratio in drive mode, using the electric motor ME, with possible addition drive provided by the heat motor through simultaneous engagement of the first gear ratio in drive mode via the heat motor.

Advantageously, the heat motor can be started by using the electric machine ME as a motor, with only the selective torque-transmitting member C245 being engaged.

Naturally, the invention is not restricted to the various manners of implementation described and represented in the attached drawings. Modifications remain possible, especially with respect to the constitution of the various elements or through substitution of technical equivalents, without, however, leaving the area of protection of the invention.

The invention claimed is:

1. An automatic transmission for a hybrid heat/electric vehicle consisting of:
   An input shaft (AE) driven by the heat motor,
   An output gearwheel, ring-gear or pinion (RCPS),
   A stationary element (ES),
   An electric machine (ME) of which the stator (ST) is fixed to the stationary element (ES),
   the first, second, third, fourth and fifth selective torque transmitting members (C124; C345; C1; C23; C5) that can be engaged or activated selectively to establish both at least three gear ratios for driving the vehicle by means of the electric machine (ME) functioning as a motor, as well as at least five gear ratios for driving the vehicle through the action of the heat motor,
   the automatic transmission further comprising a single double planetary gearset of the Ravigneaux type (TPR), containing as its constituent functional elements: first and second solar gearwheels (S1 and S2), first and second toothed ring-gears (R1 and R2) and first and second sets of satellite pinions (PS1 and PS2) mounted on a shared satellite-holder (SC), thee elements being arranged in two sets of planetary gears (ET1 and ET2) interconnected by means of one or more long pinion(s) (PL) each engaging with the said gears (ET1 and ET2),
   wherein the first and second selective torque transmitting members (C124; C345) are suited for and designed to link selectively the input shaft (AE) to one of the functional elements on the first set (ET1), wherein the third and fourth selective torque transmitting members (C1; C23) are suited for and designed to link selectively one of the functional elements of the second set (ET2) to the stationary element (ES), wherein the fifth selective torque transmitting member (C5) is suited for and designed to link to one of the functional elements of the first set premier (ET1) to the stationary element (ES), and, wherein the rotor (RO) of the electric machine (ME) is mounted directly on a functional injection element of the movement of the Ravigneaux planetary gearset (TPR), or is kinematically attached to this element by a multiplier or demultiplier gearing system of the planetary or parallel type.

2. The automatic transmission according to claim 1, wherein the rotor (RO) of the electric machine (ME) is firmly attached or kinematically linked to a functional element of the Ravigneaux planetary gearset (TPR) that can be linked kinematically, directly to the input shaft AE by means of one of the said first and second selective torque transmitting members C124; C345.

3. The automatic transmission of claim 2, wherein the functional element of the Ravigneaux planetary gearset (TPR) can be linked kinematically, directly to the input shaft AE by means of one of the said first and second selective torque transmitting members to the toothed ring-gear (R1) of the first set (ET1).

4. The automatic transmission according to claim 2, wherein each long pinion (PL) is associated both with a satellite pinion (PS1) on the first set (ET1), which engages with the said long pinion (PL) and with the ring-gear (R1) or solar gearwheel (S1) of the said set (ET1), as well as a satellite pinion (PS2) on the second set (ET2), that engages with the said long pinion (PL) and with the solar gearwheel (S2) or the ring-gear (R2) of the said set (ET2), the satellite-holder (SC) supporting the said long pinion (PL) and supporting the two satellite pinions (PS1 and PS2) with the option of free rotation.

5. The automatic transmission according to claim 2, wherein the first and second torque transmitting members (C124; C345) are suited for and designed to each link selectively to the input shaft (AE) either to the solar gearwheel (S1), or to the ring-gear (R1) that belong to the first set (ET1) of the double Ravigneaux-type planetary gearset (TPR), the gearwheel, ring-gear or output pinion (RCPS) being directly connected to the satellite-holder (SC).

6. The automatic transmission according to claim 2, wherein the fifth selective torque transmitting member (C5) is suited for and designed to link the solar gearwheel (S1) of the first set of planetary gears (ET1) to the stationary element (ES).

7. The automatic transmission according to claim 1, wherein each long pinion (PL) is associated both with a satellite pinion (PS1) on the first set (ET1), which engages with the said long pinion (PL) and with the ring-gear (R1) or solar gearwheel (S1) of the said set (ET1), as well as a satellite pinion (PS2) on the second set (ET2), that engages with the said long pinion (PL) and with the solar gearwheel (S2) or the ring-gear (R2) of the said set (ET2), the satellite-holder (SC) supporting the said long pinion (PL) and supporting the two satellite pinions (PS1 and PS2) with the option of free rotation.

8. The automatic transmission according to claim 7, wherein the first and second torque transmitting members (C124; C345) are suited for and designed to each link selectively to the input shaft (AE) either to the solar gearwheel (S1), or to the ring-gear (R1) that belong to the first set (ET1) of the double Ravigneaux-type planetary gearset (TPR), the gearwheel, ring-gear or output pinion (RCPS) being directly connected to the satellite-holder (SC).

9. The automatic transmission according to claim 7, wherein the fifth selective torque transmitting member (C5) is suited for and designed to link the solar gearwheel (S1) of the first set of planetary gears (ET1) to the stationary element (ES).

10. The automatic transmission according to claim 1, wherein the first and second torque transmitting members (C124; C345) are suited for and designed to each link selectively to the input shaft (AE) either to the solar gearwheel (S1), or to the ring-gear (R1) that belong to the first set (ET1) of the double Ravigneaux-type planetary gearset (TPR), the gearwheel, ring-gear or output pinion (RCPS) being directly connected to the satellite-holder (SC).

11. The automatic transmission according to claim 10, wherein the selective torque transmitting member (C345) is suited for and designed to link selectively the input shaft (AE) with the input ring-gear (R1) of the first set (ET1) is activated or engaged for establishing high gear ratios when the vehicle is being driven through the action of the heat motor, for establishing the third, fourth and fifth gear ratios.

12. The automatic transmission according to claim 1, wherein the fifth selective torque transmitting member (C5) is suited for and designed to link the solar gearwheel (S1) of the first set of planetary gears (ET1) to the stationary element (ES).

13. The automatic transmission according to claim 1, wherein the third torque transmitting member (C1) is suited for and designed to link selectively the ring-gear (R2) of the second set (ET2) to the stationary element (ES) and wherein the fourth transmission member (C23) is suited to and designed to link selectively the solar gearwheel (S2) of the second set (ET2) to the stationary element (ES).

14. The automatic transmission according to claim 1, wherein to establish each of the gear ratios for driving by means of the electric motor (ME), only one of the third, fourth and fifth selective torque transmitting members (C1; C23; C5) is activated or engaged, and that, for the establishment of each of the gear ratios for driving by means of the heat motor, two of the five selective torque transmitting members (C124; C345; C1; C23; C5) are activated or engaged.

15. The automatic transmission according to claim 1, wherein the gear ratios for driving a vehicle via a heat motor consist exclusively of gear ratios when moving forward, moving from a given gear to an immediately higher or immediately lower gear being performed advantageously both by the disengagement or deactivation of a single member of the pair of members that achieve the current speed, as well as through the engagement or activation of a single member that is one of the pair of members designed to achieve the new speed.

16. The automatic transmission according to claim 1, wherein the third selective torque transmitting member (C23) is activated or engaged both when second gear is established through electric motor drive and when third gear is established through heat motor drive, moving from second gear through electric drive to third gear in heat drive being performed solely through activation or engagement of the second selective torque transmitting member (C345), the electric machine (ME) being able to continue to operate in motor mode or by switching to generating mode.

17. The automatic transmission according to claim 1, wherein the fourth selective torque transmitting member (C5) is activated or engaged both when third gear is established through electric motor drive and when fifth gear is established, overmultiplied through drive via the heat motor, passing from third gear through electric drive to fifth gear in heat drive being performed solely through activation or engagement of the second selective torque transmitting member (C345), the electric machine (ME) being able to continue to operate in motor mode or by switching to generating mode.

18. The automatic transmission according to claim 1, wherein the subsequent members or pairs of selective torque transmitting members are engaged or activated respectively in order to establish a gear transmission ratio:

The third member (C1) for the first gear through electric motor (ME) drive,

The fourth member (C23) for second gear through electric motor (ME) drive,

The fifth member (C5) for third gear through heat motor (MT) drive,

The first and third members (C124 and C1) for first gear via heat motor drive,

The first and fourth members (C124 and C23) for second gear via heat motor drive, The second and fourth members (C345 and C23) for third gear through heat motor drive, The first and second member (C124 and C345) for fourth gear through heat motor drive, corresponding to a transmission ratio of 1, The second and fifth member (C345 and C5) for fifth gear through heat motor drive.

19. A method for controlling a hybrid vehicle fitted with automatic transmission according to claim 1 on a hybrid vehicle containing a rechargeable battery, wherein at startup, it consists in checking the level of charge in the battery and comparing it with a lowest threshold value, then, either starting up the vehicle kinematically via the heat motor alone if the charge level is below the threshold value, by engaging the first gear ratio in heat motor drive mode, the third member (C1) serving as a startup clutch, or starting the vehicle kinematically by means of the electric motor (ME) if the level of charge is higher than or equal to the threshold value, engaging the first gear ratio in drive mode via the electric motor (ME), with possible additional drive via the heat motor through simultaneously engaging the first gear ratio in drive mode via the heat motor.

20. The method of control according to claim 19, wherein the startup of the heat motor is performed via the electric machine (ME) functioning as a motor, only the fifth selective torque transmitting member (C245) being engaged.

* * * * *